May 26, 1964 A. E. SUST 3,134,282
TOOL HOLDER
Filed April 18, 1962
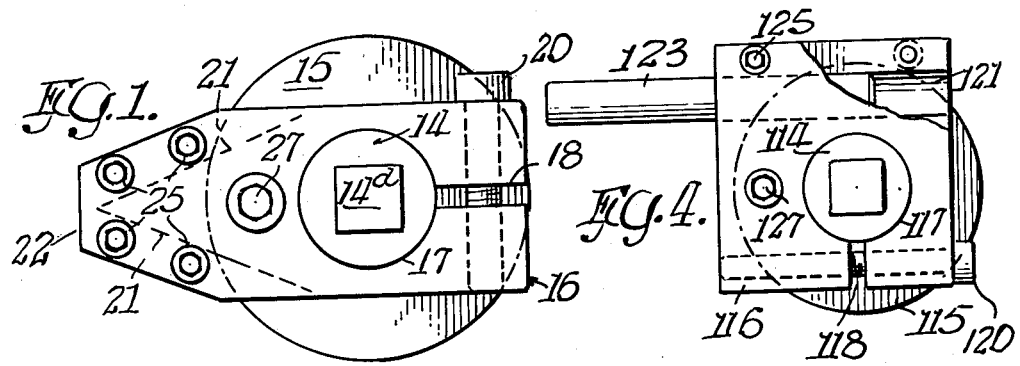
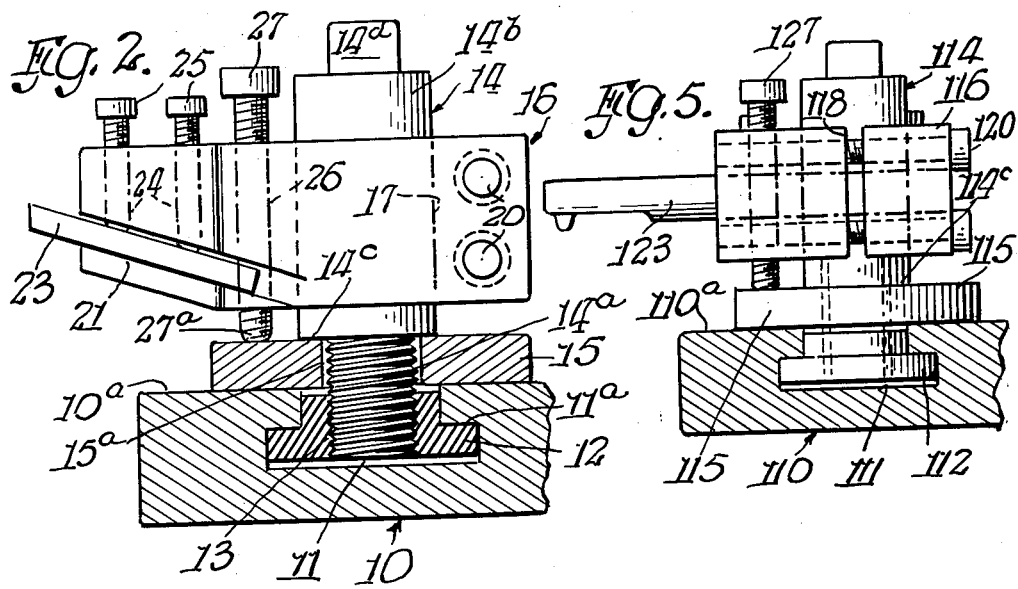
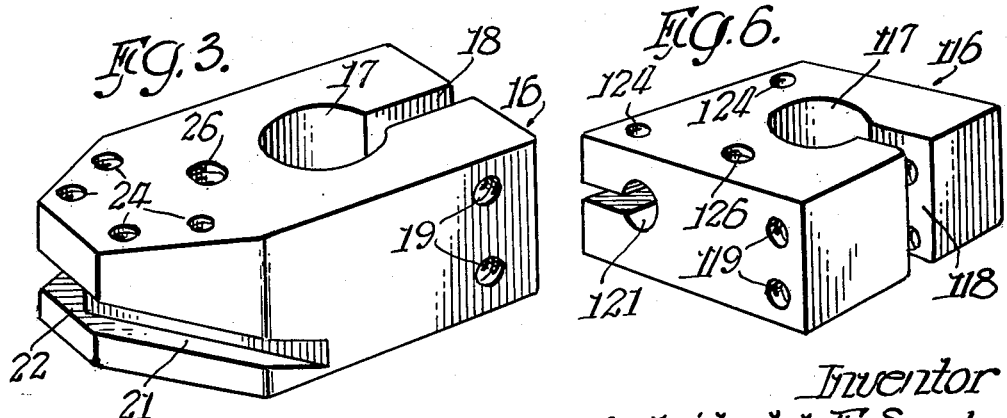
Inventor
Archibald F. Sust
by Dawson, Tilton, Fallon,
Lungmus & Alexander Attys

United States Patent Office 3,134,282
Patented May 26, 1964

3,134,282
TOOL HOLDER
Archibald E. Sust, 2456 N. Mozart Ave., Chicago, Ill.
Filed Apr. 18, 1962, Ser. No. 188,376
1 Claim. (Cl. 82—37)

This invention relates to a tool holder, and, more particularly, to a tool holder useful in conjunction with a lathe.

A principal object of this invention is to provide a rigid and powerful means for securing tool bits whereby more accuracy and better finish in turning, facing, thread cutting, etc., operations is available.

Another object is to provide a device effective to allow rapid positioning of a tool holder for different cuts and at the same time maintain rigidity of the cutting tool and the accurate centered distance of the cutting tool. Other objects and advantages may be seen in the details of construction and operation set down in this specification.

The invention will be described in conjunction with the accompanying drawing, in which:

FIG. 1 is a plan view of the invention tool holder;

FIG. 2 is an elevational view, partially in section, with portions of the supporting structure broken away, of the device seen in FIG. 1;

FIG. 3 is a perspective view of one of the elements provided in FIGS. 1 and 2;

FIG. 4 is a view similar to FIG. 1 but showing a modified type of holder such as is adapted for a boring bar;

FIG. 5 is a view similar to FIG. 2 but of the device seen in FIG. 4; and

FIG. 6 is a perspective view similar to FIG. 3 and showing the holder block associated with the device seen in FIGS. 4 and 5.

In the drawing, and with particular reference to FIG. 2, the numeral 10 designates generally a lathe portion which is equipped with the usual inverted T-shaped slot 11 provided as part of the compound. Movably positioned within the slot 11 is a base plate 12 centrally apertured and threaded as at 13 to receive the lower end 14a of the tool post 14. Additionally, the tool post 14 is equipped with a cylindrical section as at 14b and which is larger in diameter than the threaded portion 14a, thereby defining a downwardly facing shoulder 14c. The upper end of the tool post 14 is equipped with a reduced section of square configuration 14d, which serves as an integral nut.

Positioned between the compound 10 and the shoulder 14c is a circular plate 15, and positionably mounted on the tool post 14 above the shoulder 14c is a tool holder 16. The holder 16 is centrally apertured as at 17 and vertically slotted as at 18 (see FIGS. 1 and 3) so as to grip the enlarged cylindrical portion 14b of the tool post 14. The holder 16 is transversely bored as at 19 for the receipt of clamping bolts 20 (see FIG. 1).

Additionally, the holder 16 is slotted as at 21 and 22 (see FIGS. 2 and 1, respectively) for the receipt of a cutting tool 23 (seen only in FIG. 2). The holder is vertically bored and threaded as at 24 for the receipt of locking bolts 25 for immobilizing the cutting tool 23.

The holder is further bored and threaded as at 26 (see FIG. 3) for the receipt of an adjusting bolt 27. The lower end 27a of the adjusting bolt 27 bears against the base plate 15, which, as can be best seen in FIG. 2, is centrally apertured as at 15a so as to be loosely mounted on the threaded shank or lower end 14a of the tool post 14.

In the operation of the device seen in FIGS. 1 and 3, the base plate 12 is slidably positioned within the compound 10 to a desired location. At this juncture, the base plate 15 is loosely mounted on the lower shank 14a of the tool post 14. When the proper position has been achieved, a wrench or other tool is engaged with the upper integral nut 14d and the post 14 turned relative to the base plate 12. This urges the base plate 12 upwardly and into bearing contact with the upper surface 11a of the T slot, while the shoulder 14c urges the apertured circular plate 15 down into engagement with the top surface 10a of the compound. Thus the tool post is immobilized relative to the compound.

Thereafter, with the tool 23 suitably anchored in the slot 21 by means of the bolts 25, the vertical position of the tool 23 is regulated by turning the bolt 27 in a suitable fashion. When the proper height has been achieved, the bolts 20 are tightened to immobilize the holder relative to the tool post 14.

From the foregoing, it will be seen that the surface of the apertured plate 15 which determines the height position of the holder 16 is firmly based against the compound 10 so that there is no tendency of the adjusting bolt 27 to bias or distort the position of the holder 16 on the post 14.

The inventive construction can be used advantageously with a boring bar, as seen in FIGS. 4-6. In connection with this form of the invention, like numerals are employed to designate like parts (as compared with the construction seen in FIGS. 1-3), but with the addition of 100. Thus, the compound is generally designated 110 and is equipped with the usual T-shaped slot 111. Riding in the slot is the lower or base plate 112, threadedly secured to the tool post 114. An apertured plate 115 is employed which bears against the top surface 110a of the compound and which, at is upper end, abuts the shoulder 114c of the post 114.

The work holder or block is designated by the numeral 115 and is seen to be equipped with a central aperture 117 communicating with a slot 118. At one side, the block 116 is equipped with a slot 121 for the mounting of a boring bar 123. Vertically extending threaded openings 124 are provided for the receipt of securing bolts 125. The position of the holder 116 relative to the compound 110 is determined by the setting of the adjusting bolt 127, which is threadedly received within a vertical threaded bore 126 (see FIG. 6).

With the inventive structure, the boring bar holder 116 can be very accurately centered, and on account of its rigidity, yields excellent results in operation. In similar fashion, other tools may be installed on the holder 16 or 116 such as a knurling holder, cut-off tools, etc.

It will be seen that the inventive construction makes for rapid adjustment of height of the tool in fixing the position so that the tool holder can be placed in any desired position without changing the height of the tool. It also has a frontal support to reduce vibration. In this connection, the bolt 27 is equipped with a right-hand thread so that any vibration that does occur would tend to move the bolt downwardly against the apertured circular plate 15. Further, I prefer to employ threading in the bore 26, in combination with the threads on the bolt 27, to provide a No. 3, or "close" fit.

The combined tool post and holder has been found to develop perfect threads on material supported within the lathe, since the inventive construction furnishes the rigid and powerful support. This support is enhanced through the provision of the lower threaded portion 14a, which engages mating threads in the base plate 12 to provide an anchor on the compound 10 independent of the tool holder 16.

While in the foregoing specification a detailed description of the invention has been set down for the purpose of illustration thereof, many variations in the details herein given may be made by those skilled in the art without departing from the spirit and scope of the invention.

I claim:

A tool holder for a lathe, comprising a tool post having a reduced diameter threaded section at one end and a larger diameter cylindrical section adjacent thereto and defining therebetween a shoulder intermediate the ends of the post, said post at the other end having a wrench-engaging section, a base plate threadedly received on said section and contoured to be received within the lathe compound, an apertured plate slidably mounted on said post between said base plate and said shoulder and adapted to be positioned immediately adjacent said shoulder and in engagement therewith when also in engagement with said lathe compound to immobilize said base plate, a tool holder releasably mounted on said post larger diameter section, means in said holder for locking said holder on said post larger diameter cylindrical section, and a bolt in said holder bearing against said apertured plate for determining the spacing of said holder from said apertured plate.

References Cited in the file of this patent

UNITED STATES PATENTS

| | | |
|---|---|---|
| 903,501 | Prince | Nov. 10, 1908 |
| 2,168,162 | Jackson | Aug. 1, 1939 |

FOREIGN PATENTS

| | | |
|---|---|---|
| 646,326 | Great Britain | Nov. 22, 1950 |